March 12, 1935.   F. FENTON   1,994,127
WATER BOTTLE
Filed Oct. 31, 1933
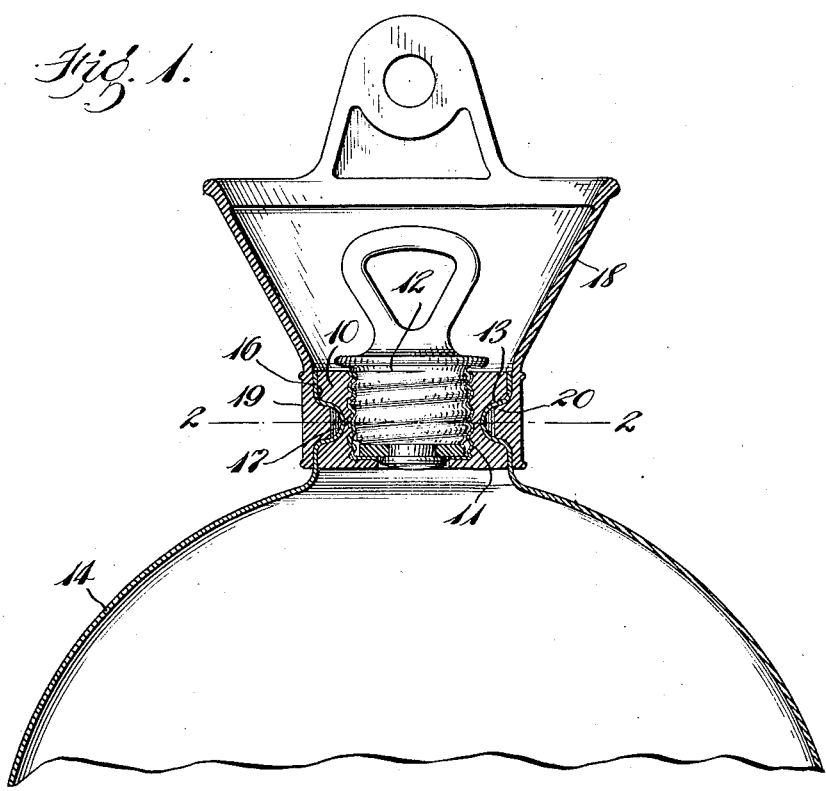
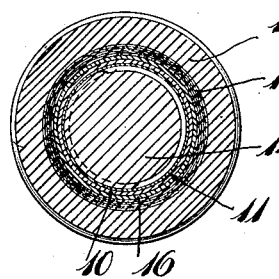
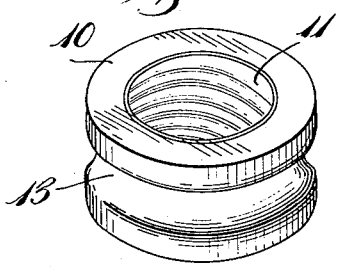
Inventor,
Frank Fenton
By Eakin & Avery
Attys Patented Mar. 12, 1935

1,994,127

UNITED STATES PATENT OFFICE 1,994,127

WATER BOTTLE

Frank Fenton, Akron, Ohio, assignor to The B. F. Goodrich Company, New York, N. Y., a corporation of New York Application October 31, 1933, Serial No. 696,061

1 Claim. (Cl. 150—1)

This invention relates to the manufacture of hollow rubber articles having a filling opening and is especially useful in the manufacture of water bottles and the like.

Heretofore it has been customary to make the body of the bottle and the filling funnel continuous and to vulcanize or cement a rigid bushing in the neck thereof to receive the threaded closure plug. Such a construction necessitated the use of complicated and expensive molds and necessitated the provision of relatively thick walls in the body portion of the bottle.

The one piece structure did not permit the use of different rubber compositions having different physical characteristics in various parts of the bottle. Where it was found convenient or desirable to provide a relatively rigid funnel, it became necessary to make the body of the bottle rigid also.

The principal objects of this invention are to provide a construction whereby materials of different physical characteristics may be incorporated in different parts of the body, to provide against leakage of fluid, to provide improved appearance, to make possible the use of a thin, flexible body member with a stiff, thick funnel while concealing and protecting the edges of the thin material, and generally to provide a novel structure.

Other objects will appear from the following description and the accompanying drawing.

Of the drawing:

Fig. 1 is a cross-sectional view of a water bottle, embodying and made in accordance with my invention in its preferred form, the section being taken along the axis of the filler opening.

Fig. 2 is a section on line 2—2 of Fig. 1.

Fig. 3 is a perspective view of the filler bushing.

Referring to the drawing, the filler bushing 10 is made from hard rubber or other rigid waterproof material. An opening is formed therethrough and threaded to receive and retain the stopper 12, the opening preferably being lined as usual with a metal ferrule 11. A peripheral groove 13 is also formed in the bushing to provide an interlock with the neck of the bottle.

The body 14 of the bottle may be formed of any elastic waterproof material such as rubber and is preferably made of thin material and substantially uniform in thickness all over, as such a body may then be readily constructed without the use of expensive molds either by depositing the rubber from a dispersion or solution thereof upon a form, or by seaming together calendered sheet material. Where the body is formed from a dispersion of rubber by deposition, an exceptionally tough article results, and no seams are present. The body of the bottle may be of different shapes depending upon the use to which it is to be put. The neck, which is of uniform thickness with the body and is formed as an extension thereof, is adapted to be slipped over the bushing 11 and to be conformed to the groove 13. For this purpose the neck may be provided with a corresponding construction 16.

To secure the neck of the bottle to the filler bushing, the neck is cemented in place and a binding of frictioned fabric or cord 17 is applied over the groove in the bushing. This assures against spreading of the neck and consequent leakage when the fluid in the bag is under pressure.

The filling funnel 18 is separately formed, preferably by molding it, from a rubber composition, and in order to assist in retaining the neck portion of the bottle and to protect the binding 17 from any liquid which might overflow the funnel, and to protect the edge of the neck from any force tending to rip the neck, the funnel is formed with an integral skirt 19 having an inwardly facing ridge 20 adapted to fill the remaining portion of the groove in the neck to lock the funnel in place. While the skirt may be of such dimensions as to retain the funnel by tension alone, it is preferred to cement it securely in place, thereby preventing entrance of moisture to the binding 17.

This construction permits of the funnel being made of any shape and of irregular wall thickness without the use of excessively large or complicated molds, whereas the body may be made of different material of uniform thickness. The parts may be made in separate colors.

This construction also reduces cost of manufacture where bottles of different sizes and shapes are required, as the same type of funnel and filler bushing may be used with different bodies.

I claim:

A fluid container comprising a flexible thin walled bag having a neck portion, a circumferentially grooved filler bushing retained within said neck portion and cemented thereto, a binding of inextensible material applied over said neck to conform the neck to the groove in the filler bushing, and a molded funnel, said funnel being provided with a depending skirt to embrace the neck of the bag and formed with an annular inwardly extending ridge to engage the groove over said binding.

FRANK FENTON.